United States Patent [19]

Tran

[11] Patent Number: 5,045,507

[45] Date of Patent: Sep. 3, 1991

[54] IN-SITU QUENCHED FLUORIDE GLASSES

[75] Inventor: Danh Tran, Bethesda, Md.

[73] Assignee: Infrared Fiber Systems, Inc., Silver Spring, Md.

[21] Appl. No.: 468,300

[22] Filed: Jan. 22, 1990

[51] Int. Cl.$^5$ ................................................ C03C 3/32
[52] U.S. Cl. ..................................... 501/40; 65/32.5;
  65/66; 65/83; 501/904; 501/906
[58] Field of Search ................... 501/40, 904; 65/32.5, 65/DIG. 16, 83

[56] References Cited

U.S. PATENT DOCUMENTS 4,666,870  5/1987  Poulain et al. ..................... 501/40
4,845,057  7/1989  Miura et al. ....................... 501/904
4,885,012 12/1989  Hutta ................................. 65/32.5

Primary Examiner—William R. Dixon, Jr.
Assistant Examiner—C. Melissa Bonner
Attorney, Agent, or Firm—Browdy and Neimark

[57] ABSTRACT

A process for producing high quality optical glass from fluoride glasses comprising preparing a melt of the glass and then cooling the melt in-situ inside the melt crucible. The in-situ quenching technique can be improved by narrowing the temperature range between the liquidus temperature and the glass transition temperature of the glass. The stability of the fluoride glass can be increased and the liquidus temperature of the glass can be lowered by doping the glass with a chloride dopant. Thorium tetrafluoride can be added to the chloride-doped glass in order to increase the chemical stability of the glass.

16 Claims, 3 Drawing Sheets

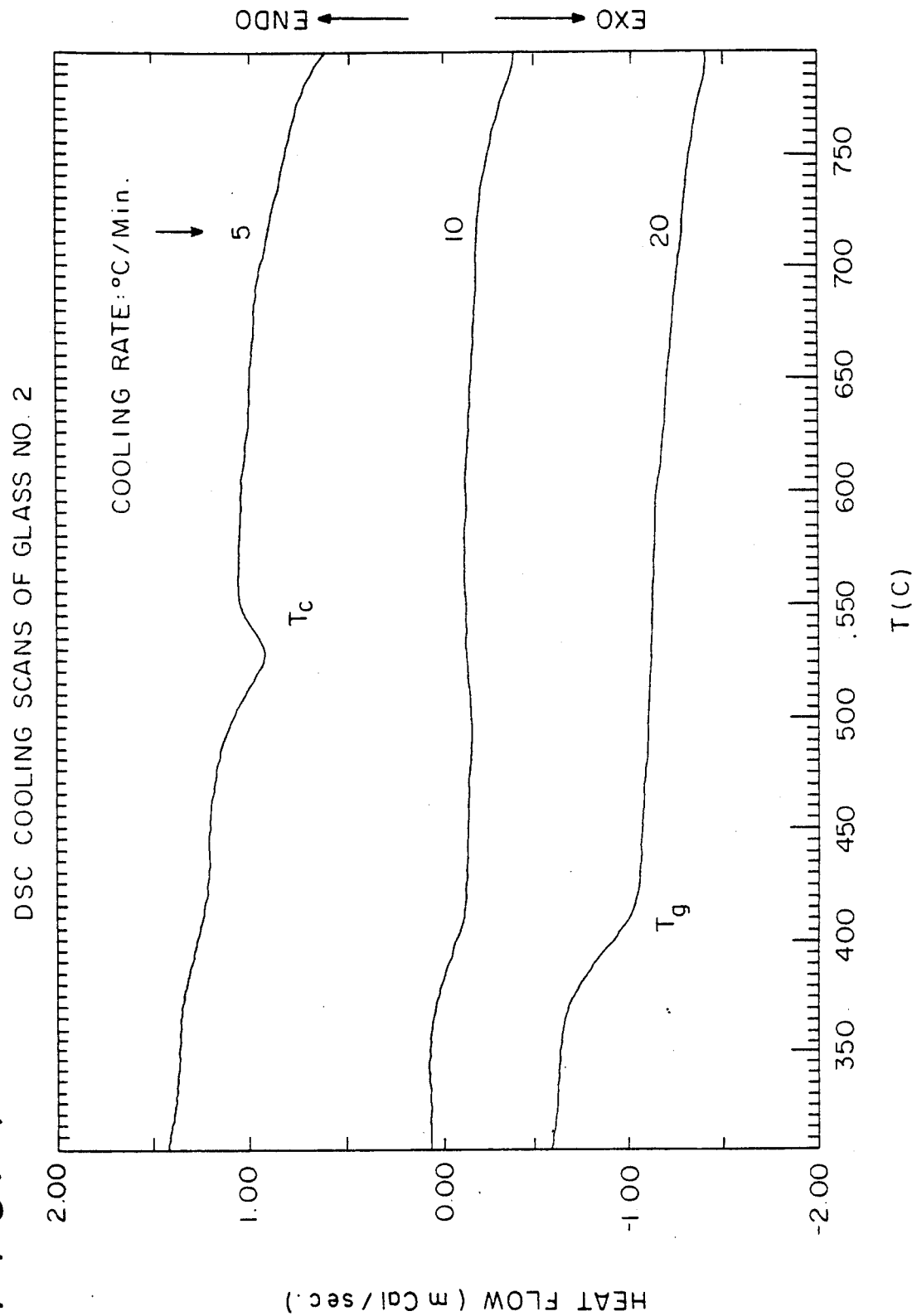

IN-SITU QUENCHED FLUORIDE GLASSES

FIELD OF THE INVENTION

The present invention relates to fluoride glass bulk optical components for use in infrared optical systems, and more particularly to fluoride glass components made from in-situ quenched fluoride glass.

BACKGROUND OF THE INVENTION

There is a great demand for infrared transmitting optical components such as windows, prisms, lenses, light pipes, and domes. Using infrared (IR) transmitting crystalline materials such as $CaF_2$, NaCl, and KCl to fabricate these articles is not cost effective, since crystal cannot readily flow like vitreous materials to form various sizes and shapes, but must be grown using extremely slow processes.

Fluoride glasses which are transparent from 0.3 $\mu$m in the UV to 7 $\mu$m in the IR have recently emerged as leading candidate materials for IR bulk optic applications. These glasses generally contain large amounts of $ZrF_4$, $HfF_4$, $ThF_4$, or $AlF_3$ as the glass network former. The remaining components may include alkali-earth metal fluorides such as $BaF_2$, $CaF_2$, $SrF_2$, etc.; alkali metal fluorides such as NaF, LiF, and the like; rare-earth fluorides such as $GdF_3$, $YbF_3$, and the like; or fluorides of Group III elements, such as $LaF_3$, $YF_3$, etc. For example, see U.S. Pat. Nos. 4,445,755; 4,346,176; 4,761,387; and 4,341,873.

Fluoride glasses are classified as very poor glass formers. Their high tendency to crystallize during melting and fabrication is generally accounted for by the features of their viscosity-temperature behavior. At the liquidus temperature $T_l$, which ranges from 700°–785° C., the fluoride glass shear viscosity is as low as 0.1 poise. The low viscosity is retained upon cooling the melt toward the glass transition temperature, $T_g$, at which point it increases rapidly. This wide temperature range between $T_l$ (wherein the melt is very fluid) and the temperature just above $T_g$ (where the melt is very viscous) does lead to rapid nucleation and growth in fluoride glass melts. This is why rapid quenching of the melt through the $T_l$-$T_g$ temperature range is necessary to produce fluoride glass articles which are free of crystalline defects. The rapid quenching criteria becomes even more critical when the melt is exposed to inhomogeneous nucleation sites during the melting and fabrication process.

At present, there are three approaches being investigated for the fabrication of fluoride glass optical components. None of these is capable of producing high optical quality glass articles in large size on a regular or production-line basis. It should be noted that a fluoride glass window measuring 5 inches in diameter by 1 inch thickness is considered to be a large size window.

The first approach for fabricating fluoride glass optical components consists of melting, and then refining, a fluoride glass at about $T_l$ under a dry atmosphere of nitrogen or argon in a platinum or gold crucible, then casting or pouring the melt into a nickel or brass mold which is pre-heated to around $T_g$ to prevent thermal shock. Fast quenching of the melt can be achieved by heat dissipation through the metallic mold. The casting technique, however, gives rise to striae or density fluctuation in the finished glass product, especially for large size articles (cf. Cook et al., "Large Scale Melting of Fluorophosphate Optical Glass", in *Proceedings for the 4th International Symposium on Halide Glasses*, Monterey (Calif.), January, 1987). In addition, sharp edges or microscopic dents which often appear at the crucible lip will act as nucleation sites which accelerate the crystallization process in the glass melt. This phenomenon will results in crystalline defects inside the finished glass article.

The second approach for making fluoride glass optical components consists of plugging the bottom nozzle of the crucible during melting, and then unplugging and draining the melt into a metallic mold, which has been preheated to approximately $T_g$. This technique seems to work well with stable glass such as the fluorophosphate glasses (cf. Cook et al.), but induces severe crystal formation when applied to fluoride glass. This is caused by various nucleation sites, as described earlier, which are confined around the crucible nozzle. To prevent nozzle induced crystallization, extremely fast quenching is required. The rapid quenching criterion is generally difficult to control and often results in cracking of the glass.

The third approach for preparing fluoride glass optical components consists of hot pressing a fluoride glass specimen into a desired shape using a closed die, as disclosed in U.S. Pat. No. 4,388,097. This process, however, requires large size and defect free fluoride glass blanks to start with. In addition, hot pressing of small pieces of glass blanks or powder together will result in trapped bubbles when the glass flows together.

SUMMARY OF THE INVENTION

It is an object of the present invention to avoid the aforementioned deficiencies in the prior art.

It is another object of the present invention to provide a process for making high optical quality fluoride glass articles in large sizes.

It is a further object of the present invention to provide a glass composition suitable for making high optical quality fluoride glass articles.

According to the present invention, a process for making high optical quality glass articles in large sizes consists of cooling the melt in situ inside the melt crucible. By quenching without disturbing the melt itself, striae and bubble formation can be avoided and crystallization induced by nucleation sites will not occur.

Any type of crucible can be used for this process, as long as the material is not attacked by fluoride glass melts. Among the materials from which the crucibles can be fabricated are platinum, gold, vitreous carbon, graphite, and the like.

Also, according to the present invention, the in situ quenching technique can be enhanced by narrowing the $T_l$-$T_g$ temperature range of the fluoride glass. This can be achieved by lowering the glass $T_l$. When $T_l$-$T_c$ becomes narrower, the quenching process can be accelerated through the temperature region where the crystallization rate is maximum and thus crystal formation inside the finished product can be avoided.

The in situ quenching process of the present invention works best with fluoride glasses which are relatively stable. The three processes described in the prior art, casting, draining, and hot pressing, also do not work with relatively unstable fluoride glasses. Very unstable fluoride glasses are those which require extremely rapid quenching such as pouring the hot melt onto a metallic block and pressing the melt with another metal block.

This results in a very thin layer of glass having a thickness of about 1 mm.

In addition to the ZBLAN and ABZNYMCS glasses, it is possible to use other glass compositions in the process of the present invention. Other glasses which can be quenched in situ include $ZrF_4$-$BaF_2$-$LaF_3$-$AlF_3$-$LiF$ (ZBLALi), $ZrF_4$-$BaF_2$-$LaF_3$-$AlF_3$-$LiF$-($PbF_2$ (ZBLA-LiPb, described in "Fluorozirconate glasses with Improved Viscosity Behavior for Fiber Drawing" D. C. Tran et al., Mat. Res. Bull. Vol. 17, pp. 1177-1184, 1982), and $ZrF_4$-$BaF_2$-$GdF_3$-$AlF_3$ (ZBGdA, as described in Mitachi et al., Jap. J. of Appl. Physics, Vol. 21, 1982). These glasses, which have properties similar to those of ZBLAN, are quite stable but have poor chemical durability.

A fluoride glass composition that has been found to be particularly well suited for use in the in-situ quenching technique of the present invention comprises approximately 10.0 mol % $ZrF_4$, 10.0 mol % $BaF_2$, 30.0 mol % $AlF_3$, 3.50 mol % $NaF$, 8.0 mol % $YF_3$, 3.50 mol % $MgF_2$, 18.0 mol % $CaF_2$, 2.0 mol % $CaCl_2$, 13.0 mol % $SrF_3$, and 2.0 mol % $ThF_4$.

BRIEF DESCRIPTION OF THE DRAWINGS

FIG. 4 shows DSC cooling scans of glass.

DETAILED DESCRIPTION OF THE INVENTION

A detailed description of the in-situ quenching technique of the present invention and the approach used for lowering $T_g$ are given below in the non-limiting examples.

In-Situ Quenching Technique

The in-situ quenching technique described herein is for fabrication of a fluoride glass article arbitrarily chosen in the form of a circular glass disc or window, although any shape can be used in this process.

Figure 1:
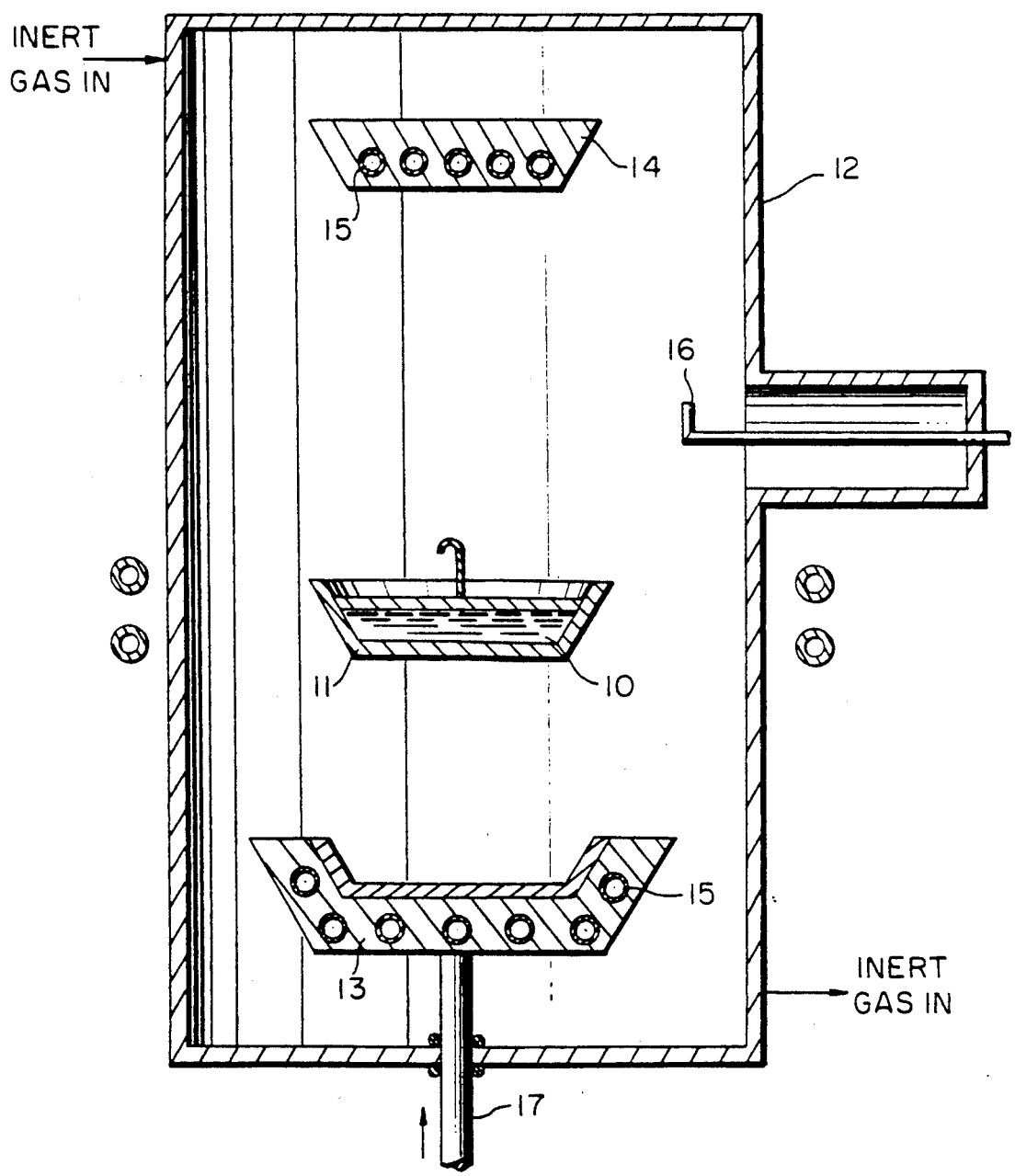
FIG. 1 shows an in-situ melting apparatus according to the present invention.
Figure 2:
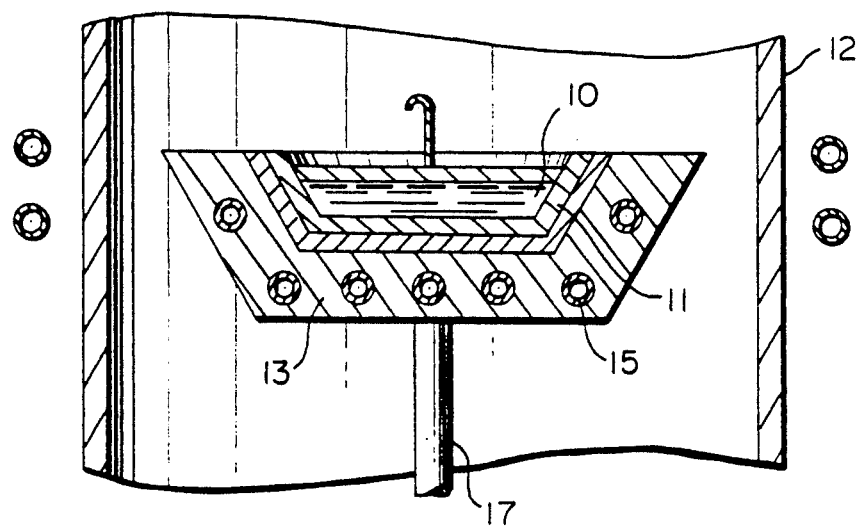
FIG. 2 shows the contact between a platinum crucible and a bottom brass form.
Figure 3:
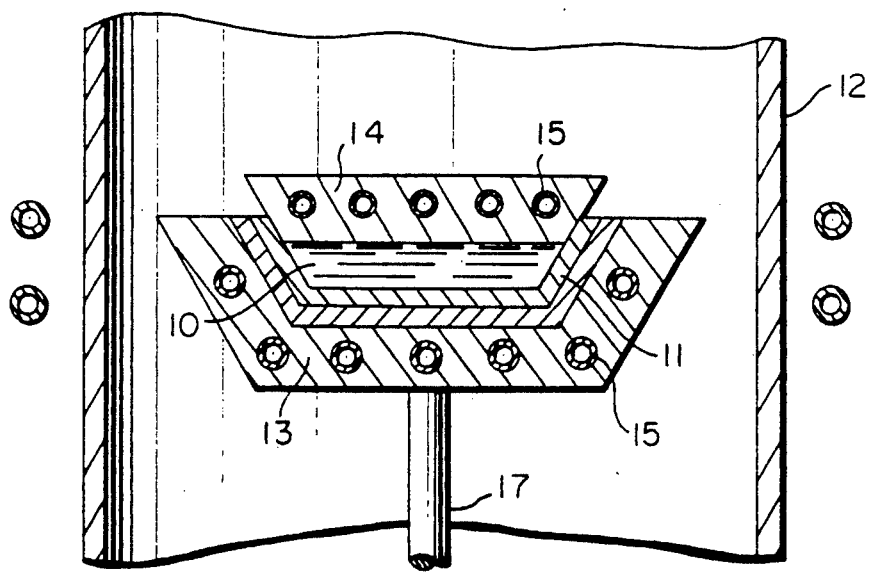
FIG. 3 shows contact between a platinum crucible and a top and bottom brass form.

Referring to FIGS. 1 and 2, a fluoride glass melt 10 is contained in a shallow and slightly tapered platinum dish or crucible 11. The melt is carried out above $T_l$ in a closed box 12 containing argon or nitrogen. To form a glass window, the platinum dish is lowered onto a bottom brass form 13 equipped with heat rods or circulating gas or oil coolant (not shown). The bottom brass form may be supported in a pedestal 17. Fast quenching takes place with heat dissipation through the brass form 13. Forced cooling can be also implemented, if desired, using circulating cold gas or oil. To increase the quenching rate, a top brass form 14 similar to the bottom form 13 can be lowered onto the top of the melt, as shown in FIG. 3. A mechanical arm 16 can be used to place the top brass form 14 onto the melt. The brass forms should be initially maintained at a temperature below $T_g$ and then subsequently increased to $T_g$ when equilibrium conditions occur, to prevent the glass window from cracking. The fluoride glass disc thus obtained can be annealed directly while being sandwiched between the brass forms. Heat rods 15, circulating gas or oil through the brass forms help to maintain the annealing temperature to about $T_g$. After annealing and cooling to room temperature, the glass disc can be easily removed by inverting the platinum dish.

Improved Fluoride Glass Compositions

The effectiveness of the in-situ quenching technique in eliminating striae, crystals, and bubbles holds true for most fluoride glass systems. Fluoride glass compositions based upon $ZrF_4$-$BaF_2$-$LaF_3$-$AlF_3$-$NaF$, hereinafter referred to by the acronym ZBLAN (cf. for example, U.S. Pat. No. 4,445,755), or $ZrF_4$-$BaF_2$-$AlF_3$-$NaF$-$YF_3$-$MgF_2$-$CaF_2$-$SrF_2$, referred to hereinafter by the acronym ABZNYMCS (cf., for example, U.S. Pat. No. 4,761,387) are suitable for use in the in-situ quenching process for making high optical quality large size glass articles. However, it is desirable to work with an optimized fluoride glass composition as described below.

ZBLAN glass is considered to be the most stable of the fluoride glasses. Its critical quenching rate, $Q_c$, defined as the slowest cooling rate tolerable to avoid crystal formation, is as low as 5° C./minute. However, ZBLAN glass also exhibits the worst resistance to chemical attack. After immersion for only two hours in a 10% HCl solution, the glass develops a whitish opaque coating and a weight loss as high as 37.9 mg/cm$^2$.

ZBANYMCS glass 10.20 mol % $Z_8F_4$, 10.60 mol % $BaF_2$, 30.20 mol % $NaF$, 8.30 mol % $YF_3$, 3.50 mol % $MfF_2$, 20.30 mol % $CaF_2$, and 13.20 mol % $SrF_2$ possesses a much higher chemical durability and appears to be ideal for infrared bulk optics application. However, ZBANYMCS glass is still relatively unstable such that fabrication of large size glass articles is not desirable. It is most desirable to optimize the ZBANYMCS glass composition to achieve a lower $T_l$ and thus, an accelerated quenching condition to avoid crystal formation, and to enhance the glass forming ability while at the time time preserving its excellent chemical durability.

In the present invention, chloride dopant is introduced into the ZBANYMCS glass first to lower its $T_l$ and shorten the $T_l$-$T_g$ range, thus allowing a fast cooling of the melt through the crystallization prone regions. Secondly, the chloride dopant is used to increase the glass stability. The decrease in the crystallization tendency with the incorporation of chloride has also been observed in ZBLAN glass (cf., "Chloride Doped ZBLAN Glass", J. M. Parker et al., in Proceedings for the 4th International Symposium on Halide Glasses, Monterey Calif., January, 1987).

The incorporation of chlorides in fluoride glasses, on the other hand, decreases the glass chemical durability because the water solubility of chlorides is much higher than fluorides. In fact, chloride glasses are so hygroscopic that they deliquesce upon exposure to air. To overcome the poor chemical resistance of chloride-doped ZBANYMCS glass, $ThF_4$ is incorporated into the glass matrix. $ThF_4$-based glasses are known to be two orders of magnitude more durable than $ZrF_4$-based glasses (cf., for example, Moynihan et al., Chemical Durability of Fluoride Glasses in Proceedings of the Fifth International Symposium on Halide Glasses, Japan, May, 1988).

It has now been found that up to 4 mol % chloride such as $CaCl_2$ or $BaCl_2$ can be incorporated into the ZBANYMCS glass by direct substitution with their fluoride counterparts to give a clear water white glass. The most stable glass was obtained with chloride concentration of approximately 2 mol %.

Table 1 compares $T_l$, $T_g$, and $T_l$-$T_g$ measured for a 10.20 mol % $ZrF_4$, 10.60 mol % $BaF_2$, 30.20 mol % $AlF_3$, 3.80 mol % NaF, 8.30 mol % $YF_3$, 3.50 mol % $MgF_2$, 18.30 mol % $CaF_2$, 2.0 mol % $CaCl_2$, and 13.20 mol % $SrF_2$ glass, hereinafter referred to as Glass No. 1, to the values obtained for a typical prior art ZBA-NYMCS glass composition, namely, 10.20 mol % $ZrF_4$, 10.60 mol % $BaF_2$, 30.20 mol % NaF, 8.30 mol % $YF_3$, 3.50 mol % $MgF_2$, 20.30 mol % $CaF_2$, and 13.20 mol % $SrF_2$, referred to hereinafter as reference glass.

TABLE 1

|  | Tl (°C.) | Tg (°C.) | Tl − Tl (°C.) | percent increase in cooling rate |
|---|---|---|---|---|
| Reference Glass | 680 | 390 | 290 | — |
| Glass No. 1 | 655 | 386 | 269 | 7.24 |

Table 1 clearly shows that the incorporation of 2 mol % $CaCl_2$ helps to lower $T_l$ as much as 25° C. and, as a result, the cooling rate of the melt can be accelerated by 7.24%.

It has also been found that $ThF_4$, which enhances the chemical durability, can be introduced by the addition of up to 8 mol % to the ZBANYMCS glass with little effect on $T_l$ and $T_g$ of the glass.

From the above, it should be noted that $ThF_4$ can be added to the chloride-doped glass, such as Glass No. 1, to increase its chemical resistance but without altering the narrow value of $T_l$-$T_g$ obtained as above. It was also observed that all $ThF_4$-doped ZBANYMCS glasses were clear and transparent to the naked eye. Glasses wherein the ThF4 concentration was above about 2 mol % exhibited a few micro-crystals under a polarized light microscope with a magnification of 6.3×. As a result an optimized fluoride glass composition comprising 10.0 mol % $ZrF_4$, 10.0 mol % $BaF_2$, 30.0 mol % $AlF_3$, 3.50 mol % NaF, 8.0 mol % $YF_3$, 3.50 mol % $MgF_2$, 18.0 mol % $CaF_2$, 2.0 mol % $CaCl_2$, 13.0 mol % $SrF_2$, and 2.0 mol % $ThF_4$ (hereinafter referred to as Glass No. 2) was formulated. The chemical durability of this glass and cooling rate parameters are compared with the two previous glass compositions in Table 2.

TABLE 2

|  | Tl (°C.) | Tg (°C.) | Tl − Tg (°C.) | percent increase in cooling rate | weight loss (mg/cm2) 10 hrs. in 10% HCl |
|---|---|---|---|---|---|
| Reference Glass | 680 | 390 | 290 | — | 5.50 |
| Glass No. 1 | 655 | 386 | 269 | 7.24 | 7.80 |
| Glass No. 2 | 659 | 389 | 270 | 6.90 | 5.50 |

According to Table 2, the glass $T_l$ can be substantially lowered by adding 2 mol % $CaCl_2$, thus insuring the melt quenching rate, but its resistance to chemical attack becomes poorer. The latter can be avoided by the addition of $ThF_4$.

As discussed above, the addition of small amounts of chlorides enhances the stability of fluoride glass. The degree of glass stability is considered to be directly proportional to the value of $(T_x-T_g)/T_g$, wherein $T_x$ is the onset of the crystallization temperature. The values of $(T_x-Tg)/T_g$ for Glass No. 2 are compared with the reference glass in Table 3.

TABLE 3

|  | $T_x$ (°C.) | $T_g$ (°C.) | $(T_x - T_g)/T_g$ (°C.) |
|---|---|---|---|
| Reference Glass | 540 | 390 | 0.38 |
| Glass No. 2 | 553 | 389 | 0.42 |

According to Table 3, Glass No. 2 exhibits a better glass forming ability. In fact, its $(T_x-T_g)/T_g$ of 0.42 is nearly equivalent to that of the most stable fluoride glass known to date, the composition of which is 53 mol % $ZrF_4$, 20 mol % $BaF_2$, 4 mol % $LaF_3$, 3 mol % $AlF_3$, 20 mol % NaF, and the $(T_x-T_g)/T_g$ of which is 0.45.

The high degree of stability of Glass No. 2 is reflected in the cooling cure obtained from differential scanning calorimetry (DSC) and shown in FIG. 4. Even at a slow cooling rate of 20° C./min as well as of only 10° C./minute, the glass did not crystallize, since the DSC cooling curves of FIG. 4 shows a glass transition region and no exothermic crystallization peak. At 5° C./minute, crystallization did occur, giving rise to an exothermic peak at 520° C. The quenching rate of 10° C./minute is usually defined as the critical cooling rate $Q_c$.

The following nonlimiting examples are given better to define the present invention.

EXAMPLE 1

A fluoride glass composition consisting of 10.0 mol % $ZrF_4$, 10.0 mol % $BaF_2$, 30.0 mol % $AlF_3$, 3.50 mol % NaF, 8.0 mol $YF_3$, 3.50 mol % $MgF_2$, 18.0 mol % $CaF_2$, 2.0 mol % $CaCl_2$, 13.0 mol % $SrF_2$, and 2.0 mol % $ThF_4$ was chosen to fabricate a window blank 4 inches in diameter and 0.5 inch thick. All starting materials were optical grade fluoride chemicals from E. M. Chemicals. The starting materials were batched and mixed inside a glove box containing dry argon. A 410 g melt was conducted inside the glove box using a platinum crucible at 925° C. for two hours and was then refined at 680° C. for 30 minutes. The crucible was subsequently removed from the furnace using platinum tongs and the melt was cast directly into a brass mold having a cavity measuring 4 inches in diameter by 0.5 inch thick. The mold was pre-heated at 290° C. The mold temperature was the increased to 385° C. upon solidification of the melt. The glass window was annealed at 385° C. for two hours, then cooled slowly to room temperature. The quenching rate, based upon the drop in the melt temperature and time required for solidification, was determined to be 95° C./minute. Although the quenching rate achieved here was much higher than the critical cooling rate of 10° C./minute of the glass, the finished glass window still exhibits rows of crystals which were clearly visible even to the naked eye.

It was concluded that crystallization was induced by nucleation sites at the platinum crucible lip. When immersed in an index matching oil, the glass window revealed localized compositional fluctuation or striae under polarized light at 6.3× magnification. No cracks were observed on the window.

EXAMPLE 2

The same glass composition and raw materials as in Example 1 were used to fabricate a window blank 6 inches in diameter and one inch thick. A 1,835 gram melt was carried out in a platinum crucible 6 inches in diameter×2.5 inches in height under a dry argon atmosphere inside a glove box at 925° C. for two hours. After refining at 680° C. for 30 minutes, the platinum crucible was dropped inside a bottom brass form through which forced cooling argon gas was circulated, as shown in FIG. 1. The mold originally was at room temperature, and the circulating gas was at 0° C. When solidification started to occur, the gas temperature was quickly increased to 385° C. The quenching rate was determined to be 36° C./minute. The window thus obtained exhibited no bubbles, crystals, or striae when examined under polarized light, in index matching liquid, at 16× magnification. No cracks were detected.

EXAMPLE 3

A 2020 gram batch comprising of 53 mol % $ZrF_4$, 20 mol % $BaF_2$, 4 mol % $LaF_3$, 3 mol % $AlF_3$, 20 mol % NaF was processed for making a window blank 6 inches in diameter×1 inch thick. The glass was melted at 850° C. for two hours, then refined at 600° C. for 30 minutes. The melt was then quenched in-situ, as in Example 1, but with the gas temperature increased from 0° C. to 260° C. to anneal the glass. The window blank obtained showed no cracks, bubbles, crystals, and compositional fluctuations when examined under polarized light, in index matching liquid, and at 16× magnification. The window blank, however, exhibited surface hydrolysis and degradation after two hours of exposure in liquid water. The surface of the window looked opaque.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A process for producing optical quality fluoride glass in large sizes comprising:
   introducing a fluoride glass composition into a crucible;
   melting said fluoride glass composition into a crucible;
   quenching said glass composition while said glass composition remains in said crucible so as to avoid formation of nucleation sites, said quenching being carried out by positively cooling said crucible and said glass.

2. The process according to claim 1 wherein the process is carried out in an inert atmosphere.

3. The process according to claim 1 wherein said positive cooling is carried out by placing the crucible onto a bottom brass mold.

4. The process according to claim 3 wherein the bottom brass mold is equipped with heat rods to remove heat from said mold.

5. The process according to claim 3 wherein the bottom brass mold is cooled with circulating coolant.

6. The process according to claim 3 wherein a top brass form is placed on top of the crucible during cooling of the melt.

7. The process according to claim 3 wherein the bottom brass mold is initially maintained at a temperature below the glass transition temperature of the fluoride glass.

8. The process according to claim 6 wherein the top brass form is initially maintained at a temperature below the glass transition temperature of the fluoride glass.

9. The process according to claim 1 wherein the liquidus temperature of the fluoride glass is reduced by introducing a chloride dopant into the fluoride glass.

10. The process according to claim 9 wherein the chloride dopant is introduced in amounts up to 4 mol % of the glass composition.

11. The process according to claim 9 wherein up to 8 mol % of $ThF_4$ is included in the glass composition to increase the chemical durability of the chloride-doped glass.

12. The process according to claim 1 wherein the fluoride glass is a fluoride glass wherein up to 4 mol % by weight of a fluoride in the glass is replaced by chloride.

13. The process according to claim 12 wherein the chloride in the fluoride glass is provided by a compound selected from the group consisting of calcium chloride and barium chloride.

14. The process according to claim 12 wherein the fluoride glass additionally contains up to 8 mol % thorium tetrafluoride.

15. A fluoride glass made according to the process of claim 14 are consisting essentially of about 10.0 mol % $ZrF_4$, about 10.0 mol % $BaF_2$, about 30.0 mol % $AlF_3$, about 3.50 mol % NaF, about 8.0 mol % $YF_3$, 3.50 mol % $MgF_2$, about 18.0 mol % $CaF_2$, about 2.0 mol % $CaCl_2$, about 13.0 mol % $SrF_2$, and about 2.0 mol % $ThF_4$.

16. A process for making optical quality fluoride glass in large sizes comprising:
   introducing a fluoride glass composition into a crucible, said fluoride glass composition having a lowered liquidus temperature by the presence of chloride therein;
   melting said glass composition in said crucible;
   cooling said glass composition while said glass composition remains in said crucible so as to avoid formation of nucleation sites.

* * * * *